May 19, 1959 — B. T. HUMPHREVILLE — 2,886,896
MEANS FOR SETTING A CUTTING TOOL
Filed March 11, 1958
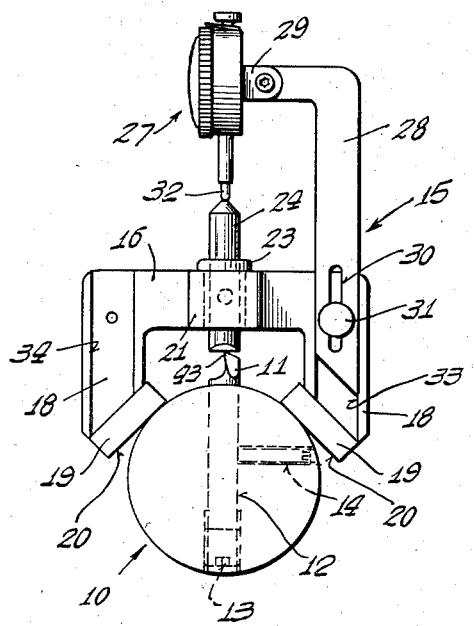
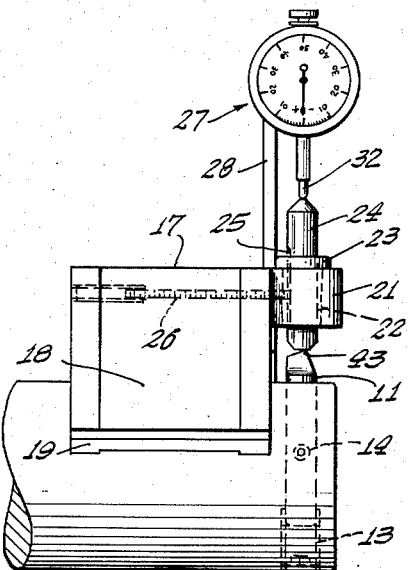
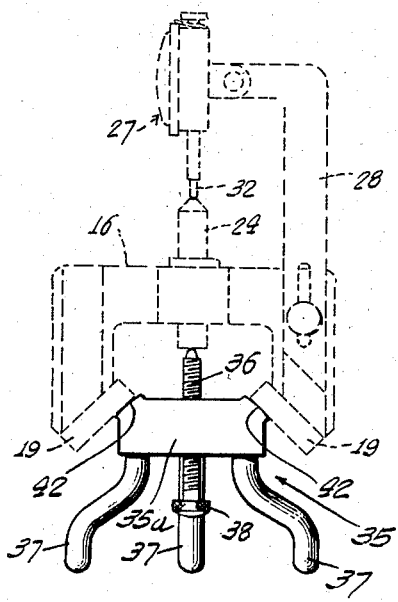
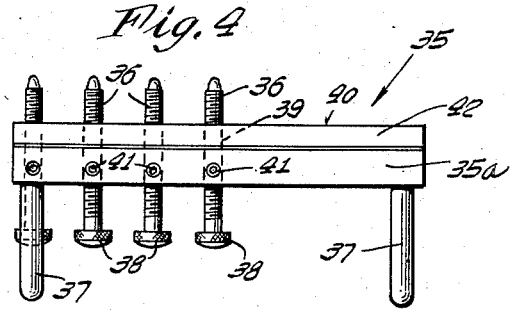
INVENTOR.
Byron Humphreville
BY
Johnson and Kline
ATTORNEYS

2,886,896
MEANS FOR SETTING A CUTTING TOOL

Byron T. Humphreville, Stratford, Conn., assignor to Niantic Co. Inc., a corporation of Connecticut Application March 11, 1958, Serial No. 720,569

3 Claims. (Cl. 33—185)

The present invention relates to apparatus for accurately setting a cutting tool for cutting a hole within small tolerances and for enabling the replacement of the cutting tool with speed and facility.

Heretofore the positioning of a cutting tool in a tool bar, such as a boring tool bar, to cut an accurate size cylindrical hole has been mostly a matter of trial and error. Thus initially a cut is taken in the work to form a hole, the size of the hole is measured and the cutting tool extended outwardly from the tool bar a distance which the operator believes by guessing approximates the difference between the hole size and the final hole size. Then another cut is taken in the hole and the hole is measured and the hole may be too large (which causes scrapping of the work), or not large enough; if the latter then the cutting tool is moved outwardly again until finally an approximate location of the cutting edge of the cutting tool is found which produces the desired size of the hole. It is obviously apparent that this method is time consuming and hence extremely costly, is unreliable since it depends on the skill of the worker, and produces a large scrap loss. Moreover, upon once setting the cutting tool it has been found, when the tool is utilized in certain types of materials which are currently utilized in parts for aircraft, that only a limited number of cuts can be taken before the cutting tool becomes dull and has to be replaced. Replacing the tool requires going through the trial and error method above recited with the attendant disadvantages.

It is an object of the present invention to provide an apparatus which enables a cutting tool to be set accurately and economically in a tool bar to cut a hole having dimensions held within small tolerances.

It is a further object of the present invention to provide in an apparatus of the above type in which a cutting tool can be replaced upon becoming dull by its replacement with the replacing tool being set accurately with speed and facility.

A further object of the present invention is to provide an apparatus of the above type which is simple to use and which is economical to manufacture and which readily performs its intended purposes.

In carrying out the present invention, the apparatus consists of two pieces, an indicator carrier and a reference stand. The indicator carrier enables measurement of the distance that the cutting edge of the tool is projected outwardly from the tool bar to cut a hole of the desired size within close tolerances. After the cutting tool has been set in position, the indicator carrier is then positioned on the reference stand to enable an adjustable member on the reference stand to be set at a point which corresponds to the distance which the edge of the tool projects outwardly from the tool bar. Thus when the cutting tool requires replacement, it is a simple matter to position the new cutting tool in the tool bar by placing the indicator carrier on the reference stand to find the exact reading where the edge of the cutting tool should be to form the desired size hole and then to position the indicator carrier on the tool bar and move the cutting tool out to this location as indicated on the indicator carried by the indicator carrier. Accordingly the initial cutting tool can be accurately set with ease and then the positioning of a replacing cutting tool is quickly, easily and accurately accomplished.

Other features and advantages will hereinafter appear.

In the drawing:

Figure 1 is a side view of the indicator carrier positioned on a tool bar.

Fig. 2 is a front view of Fig. 1.

Fig. 3 is a plan of the side portion of the indicator carrier.

Fig. 4 is a front view of the referenced stand.

Fig. 5 is a side view of the reference stand with the indicator carrier being shown in dotted lines positioned thereon.

Referring to the drawing, there is shown in Figs. 1 and 2 a cylindrical tool bar 10 having a cutting tool 11 positioned within a diametric aperture 12 and a setscrew 13 for providing for adjustment of the cutting tool 11. There is also provided a locking screw 14 which bears against the tool 11 to lock it in adjusted position. This tool bar is of the type which is commonly employed in boring machines though, of course, the invention is not to be considered limited thereto since it is applicable to other and different tool bars and machines having tool bars which rotate.

The indicator carrier generally indicated by the reference numeral 15 comprises an elongated, substantially U-shaped frame 16 having a bight portion 17 and legs 18 depending perpendicularly from the outer longitudinal edges of the bight portion. The legs terminate in feet 19 each of which has a flat surface 20 which converges inwardly toward the bight portion of the frame. The surfaces converge at the same angle and the legs are equally spaced from a vertical plane containing the center line of the bight portion 17. Adjacent the front end of the frame and attached at the center line of the bight portion is an integral projection 21 having a bore 22 in which is positioned a bushing 23. Slidably mounted in the bushing 23 is a pin 24 having a flat longitudinal surface 25 on which the end of a setscrew 26 slides to prevent rotation of the pin 24 with the setscrew 26 extending longitudinally through the bight portion of the frame.

An indicator 27 of the type having a rotatable dial calibrated in .0001 (though other well-known types may be utilized if desired) is mounted on the indicator carrier by a right angle bracket arm 28 to which at one end is secured a tab 29 of the indicator. At its other end, the bracket 28 has an elongate aperture 30 through which passes a threaded thumb nut 31 which threads in an aperture in the frame to enable vertical adjustment of the indicator and to clamp it in the selected position. The indicator has an operating shaft 32 and to maintain the indicator in alignment with the pin 24, the front of the frame is provided with a slot 33 in which the other end of the bracket slides. There is also provided a similar slot 34 on the opposite leg of the frame to enable the indicator to be positioned on either leg of the frame to have the dial directed toward the front of the machine to facilitate reading thereof. It will be noted that the pin 24 is in the middle of the frame and mounted for movement parallel to the legs 18 and the slots 33, 34 are spaced an equal distance from the center of the frame.

The reference stand as shown in Figs. 4 and 5 and generally indicated by the reference numeral 35 comprises an elongate, substantially rectangular in cross-section, block 35a of hardened metal, such as steel, through which pass a plurality of reference members 36. Legs 37 are provided to space the block 35a above a working surface. The members 36 are each threaded and provided with a manually operable head 38 to enable turning of the pins in threaded apertures 39 formed in the block 35a to enable the end of the members to be adjusted relative to the upper surface 40 of the frame. A plurality of setscrews 41 are provided for maintaining each member in its adjusted position. The side corners of the upper surface 40 of the frame are arcuate, as at 42, and are segments of a circle with a center located below the frame, and yet the center is common to both arcs.

In use, when it is desired to set the cutting edge 43 of the tool to cut a hole having dimensions held within a tolerance of plus or minus .00025 for example, the cutting tool 11 is initially adjusted by the setscrew 13 to cut a hole which may be approximately .015 or .020 smaller in diameter than the desired final size of the hole. The diameter of the hole is then measured and subtracted from the desired hole size and the difference is halved to give the distance which the cutting edge 43 of the tool 11 has to be moved outward. The indicator carrier 15 is then positioned on the tool bar 10 in the manner shown with the surfaces 20 resting on the tool bar 10 and with the end of the cutting tool 11 engaging the flat on the end of the pin 24. The carrier 15 is then arcuately moved on the bar so that the end of the pin travels in a large arc which is in exact and consistent relation to the center about which the cutting tool 11 revolves until the high point of the arc is plainly indicated by the indicator 27. Then the setscrew 13 is turned to move the cutting tool 11 outwardly the above noted distance while maintaining the carrier at the high point of the cutting tool 11, and it will be appreciated that this distance can be accurately determined by its measurement on the indicator 27. With the cutting tool thus located, the hole is cut and with an excellent boring machine and work of good machinability, the hole will have the desired size within approximately plus or minus .00025 inch. It will be noted that the lower end of the pin 24 is beveled to a small flat diametric length to facilitate finding the high spot of the tool 11.

The present invention enables, with speed and facility, the checking of the edge of the cutting tool to ascertain whether it is being maintained in the correct position and for the accurate setting of a replacement cutting tool when the first one becomes dull, without requiring the trial and error method recited above. To this end, the invention provides for the storage of the position of the cutting edge on the reference stand. Accordingly, the carrier 15 is positioned on the reference stand 35 with the surfaces 20 engaging the arcuate surfaces 42 and the bottom of the pin 24 is in engagement with the top of a reference member 36. The reference member is then adjusted by the head 38 until there is indicated on the indicator the same reading that the high spot of the cutting edge of the tool 11 causes. The setscrew 41 then locks the threaded member 36 in this position.

When it is desired to replace the cutting tool 11, the indicator carrier is positioned on the reference block as shown in Fig. 5 and the reading which the end of the member 36 causes the indicator to have is noted. The indicator carrier is then mounted on the tool bar as in Figs. 1 and 2 and the new cutting tool which has replaced the cutting tool 11 is positioned within the aperture 12 and moved by the setscrew 13 until the indicator indicates the above noted reading. The replacing cutting tool is then locked in position by the setscrew 14 and it will cut a same size hole as the cutting tool 11 did within the accuracy limits of the indicator.

In order to enable the indicator carrier and the reference stand to be utilized on a plurality of cutting tools, there is provided a plurality of reference members 36, each of which stores the correct reading for one cutting tool. Thus it is possible for the apparatus of the present invention to be utilized on a plurality of cutting tools.

It will accordingly be appreciated that there has been disclosed a novel apparatus which enables, with ease and accuracy, the positioning of a cutting tool to cut a hole in a piece of work with dimensions held within small tolerances, for the storage of the correct position of the cutting edge of the tool on a reference stand and for the replacement of the cutting tool by a new cutting tool. The cutting edge of the new tool is accurately positioned with speed and facility by using the information stored on the reference stand, and hence obviates the initially recited expensive trial and error method of setting a tool. The apparatus of the present invention is sturdily constructed, relatively inexpensive with regard to the results achieved, and is utilizable in a plurality of installations.

Variations and modifications may be made within the scope of the claims and portions of the improvements may be used without others.

I claim:
1. An apparatus for setting the cutting edge of a cutting tool carried by a tool bar comprising an indicator carrier and a reference stand, said carrier comprising an elongate frame having a bight portion and a leg projecting from each side thereof, the end of each leg being formed to have a flat surface inclined inwardly toward the bight portion, a pin mounted on the bight portion for axial movement on a line transverse to the bight portion, an indicator having an operating link, and means mounting the indicator on the frame with the operating link being disposed for operation by the axial movement of the pin; said reference stand comprising an elongate block having an upper face, surface means on the block for supporting the pin of the carrier above the upper face, and at least one member mounted on the block for movement of its end an adjustable distance above the upper face.

2. An apparatus for setting the cutting edge of a cutting tool carried by a tool bar comprising an indicator carrier and a reference stand, said carrier comprising an elongate frame having a bight portion and a leg projecting from each side thereof, the end of each leg being formed to have a flat surface inclined inwardly toward the bight portion, a pin mounted on the bight portion for axial movement on a line transverse to the bight portion, an indicator having an operating link, and means mounting the indicator on the frame with the operating link being disposed for operation by the axial movement of the pin; said reference stand comprising an elongate block having an upper face, the longitudinal edges of the upper face being arcuate with the center of the arcs being common, and at least one member mounted on the block for movement of its end an adjustable distance above the upper face.

3. An apparatus for setting the cutting edge of a cutting tool carried by a tool bar comprising an indicator carrier and a reference stand, said carrier comprising an elongate frame having a bight portion and a leg projecting perpendicularly from each longitudinal side thereof, the end of each leg being formed to have a flat surface inclined inwardly toward the bight portion, said surfaces being inclined the same degree and being equispaced from a plane drawn perpendicularly through the middle of the bight portion, a pin mounted on the midpoint of the bight portion for axial movement on a line transverse to the bight portion, an indicator having an operating link, and means mounting the indicator on the frame with the operating link being disposed for operation by the axial movement of the pin; said reference stand comprising an elongate block having an upper face, the longitudinal edges of the upper face being arcuate with the center of the arcs being common, and at least one member mounted on the block for movement of its end an adjustable distance above the upper face.

References Cited in the file of this patent
UNITED STATES PATENTS 2,819,534     Kitzman _____ Jan. 14, 1958

FOREIGN PATENTS 750,861     Germany _____ Jan. 30, 1945
854,738     Germany _____ Nov. 6, 1952